(12) United States Patent
Greger

(10) Patent No.: US 10,843,401 B2
(45) Date of Patent: Nov. 24, 2020

(54) FUSE MOLDED THREE DIMENSIONAL ARTICLE AND A METHOD FOR MAKING THE SAME

(71) Applicant: KRATON POLYMERS U.S. LLC, Houston, TX (US)

(72) Inventor: Marcus Greger, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 14/070,053

(22) Filed: Nov. 1, 2013

(65) Prior Publication Data

US 2015/0125682 A1 May 7, 2015

(51) Int. Cl.
| | |
|---|---|
| B29C 67/00 | (2017.01) |
| C08L 53/00 | (2006.01) |
| B29C 64/118 | (2017.01) |
| B29C 70/68 | (2006.01) |
| B33Y 10/00 | (2015.01) |
| B33Y 70/00 | (2020.01) |
| B29K 25/00 | (2006.01) |
| B29K 96/04 | (2006.01) |
| B29K 105/00 | (2006.01) |

(52) U.S. Cl.
CPC ........ *B29C 64/118* (2017.08); *B29C 67/0055* (2013.01); *B29C 70/68* (2013.01); *C08L 53/00* (2013.01); *B29K 2025/08* (2013.01); *B29K 2096/04* (2013.01); *B29K 2105/0085* (2013.01); *B29K 2867/00* (2013.01); *B29K 2875/00* (2013.01); *B29K 2995/007* (2013.01); *B33Y 10/00* (2014.12); *B33Y 70/00* (2014.12); *Y10T 428/24983* (2015.01)

(58) Field of Classification Search
CPC ......... B29C 67/00; B29C 67/68; C08L 53/00; Y10T 428/24983; B33Y 70/00; B33Y 10/00; B29K 2025/08; B29K 2105/0085; B29K 2867/00; B29K 2875/00; B29K 2995/007; B29K 2096/04
USPC ........................................... 428/217
See application file for complete search history.

(56) References Cited

U.S. PATENT DOCUMENTS

| | | |
|---|---|---|
| RE27,145 E | 6/1971 | Jones |
| 3,595,942 A | 7/1971 | Wald et al. |
| 3,634,549 A | 1/1972 | Shaw et al. |
| 3,670,054 A | 10/1972 | De La Mare et al. |
| 3,985,830 A | 10/1976 | Fetters et al. |
| 4,039,593 A | 8/1977 | Kamienski et al. |
| 4,391,949 A | 7/1983 | St. Clair |
| 4,444,953 A | 4/1984 | St. Clair |
| 4,578,429 A * | 3/1986 | Gergen ................ C08L 53/025 525/274 |
| 4,788,361 A | 11/1988 | Olson et al. |
| 5,503,785 A | 4/1996 | Crump et al. |
| 6,492,469 B2 | 12/2002 | Willis et al. |
| 6,645,412 B2 | 11/2003 | Priedeman, Jr. |
| 7,067,589 B2 | 6/2006 | Bening et al. |
| 7,169,848 B2 | 1/2007 | Bening et al. |
| 7,267,855 B2 | 9/2007 | Handlin, Jr. et al. |
| 7,314,591 B2 | 1/2008 | Priedeman, Jr. |
| 7,364,686 B2 | 4/2008 | Kritchman et al. |
| 8,420,001 B2 | 4/2013 | Leuterer et al. |
| 2003/0166776 A1 * | 9/2003 | Wright et al. ............. 525/88 |
| 2007/0066753 A1 * | 3/2007 | Ehrlich et al. ............. 525/89 |
| 2007/0225428 A1 | 9/2007 | Bening et al. |
| 2007/0225429 A1 * | 9/2007 | Wright et al. ........... 524/505 |
| 2007/0232747 A1 * | 10/2007 | Maris .............. C08F 297/04 524/505 |
| 2007/0241482 A1 | 10/2007 | Giller et al. |
| 2008/0006966 A1 | 1/2008 | Manella |
| 2008/0015306 A1 * | 1/2008 | Wright et al. ........... 524/572 |
| 2011/0060445 A1 | 3/2011 | Heenan |
| 2011/0076495 A1 * | 3/2011 | Batchelder ........... B29C 64/106 428/369 |
| 2011/0082225 A1 * | 4/2011 | Qian ................ C08L 53/02 521/139 |
| 2011/0112236 A1 * | 5/2011 | Ding ...................... 524/505 |
| 2011/0184082 A1 * | 7/2011 | Wright et al. ............ 521/148 |

(Continued)

FOREIGN PATENT DOCUMENTS

| | | |
|---|---|---|
| CA | 716645 A | 8/1995 |
| CN | 102686665 B | 4/2014 |

(Continued)

OTHER PUBLICATIONS

Wagner et al., Extrusion: The Definitive Processing Guide and Handbook, 1st Edition, 2005, Section 22.1.*
Smooth-On, Shore Hardness Scales, 2008.*
Design-Tek, "What is Overmolding?", http://designtekplastics.com/tips/what-is-overmolding/, Oct. 26, 2013.*
Biron, Michel. Thermoplastics and thermoplastic composites. William Andrew, 2012. p. 366 (Year: 2012).*

(Continued)

*Primary Examiner* — Michael Zhang
(74) *Attorney, Agent, or Firm* — Ramesh Krishnamurti

(57) ABSTRACT

A fuse molded modeling three dimensional article having areas of dissimilar or different hardness is described, wherein one of said areas is hard and is plastic, metal, glass, wood, concrete, rock, or mixtures thereof, and another of said areas is a less hard area comprising a controlled distribution hydrogenated styrenic block copolymer composition. Although the metal, glass, wood, concrete, and rock are not fuse moldable material, the plastic and the controlled distribution hydrogenated styrenic block copolymer composition are. Thus the scope of the invention is meant to include articles where only one area or layer of the article is fuse molded, or wherein both the hard area/layer and the soft area/layer is formed via a fuse molded technique.

12 Claims, No Drawings

(56) References Cited

U.S. PATENT DOCUMENTS

2013/0040091 A1* 2/2013 Dikovsky ............. B29C 64/386
428/68
2016/0177078 A1* 6/2016 Naito ..................... C08L 67/02
264/109

FOREIGN PATENT DOCUMENTS

| JP | 2007051237 A | 3/2007 | | |
|---|---|---|---|---|
| JP | 2009091385 A | 4/2009 | | |
| WO | 0235397 A2 | 5/2002 | | |
| WO | WO 2011135496 A2 * | 11/2011 | ......... | B29C 67/0059 |
| WO | 2012058278 A2 | 5/2012 | | |
| WO | 2012143182 A1 | 10/2012 | | |
| WO | WO 201214318 A * | 10/2012 | | |
| WO | 2013148024 A1 | 10/2013 | | |

OTHER PUBLICATIONS

Espalin D, Ramirez J, Medina F, Wicker R (2012) Multi-material, multi-technology FDM system. 23rd Annual International Solid Freeform Fabrication Symposium. pp. 828-835, Aug. 2012, Austin (Year: 2012).*

Zelinski, Peter, "Redefining Plastics Manufacturing," Modern Machine Shop, Jan. 9, 2012, https://www.mmsonline.com/articles/redefining-plastics-manufacturing (Year: 2012).*

International Search Report for PCT/2014/062122 dated Feb. 6, 2015.

* cited by examiner

FUSE MOLDED THREE DIMENSIONAL ARTICLE AND A METHOD FOR MAKING THE SAME

BACKGROUND OF THE INVENTION

1. Field of the Invention

Additive Process manufacturing is a process of joining materials to make articles, usually layer upon layer, as opposed to subtractive manufacturing technologies. Included in this definition is Fused Deposition Modeling process where a movable head or nozzle deposits onto a substrate a bit of molten polymeric material. The molten material solidifies within a very short time after extrusion and cold welds to the previous layer. The present invention is an article with at least one area of the article having layers of dissimilar hardness, wherein one of the layers comprises a composition of controlled distribution hydrogenated styrenic block copolymer. The invention also concerns a process of making or forming the article. Fused Deposition Modeling typically uses 3D printers where one of the layering steps is accomplished with controlled distribution hydrogenated styrenic block copolymer.

2. Prior Art

Fused Deposition Modeling is a known process for making articles from a suitable thermoplastic resin such as acrylonitrile-butadiene-styrene (ABS). The benefit of the process is that an article can be made straight from computer aided design (CAD) systems—eliminating the need for a prototype or mold. The ABS modeling material used in a 3-D printer can be in the form of a flexible filament, sticks, or pellets and supplied initially in solid form to an extrusion head of the printer. The extrusion head melts a bit of the filament, stick or pellets and deposits the molten ABS in a specific spot indicated by the CAD system. Very quickly the molten ABS re-solidifies and the extrusion head moves to the next CAD indicated spot and repeats the process, thus forming an article.

Suitable thermoplastic resin must have a tensile strength of between 3000 psi and 12,000 psi. Also the resin must have a melt flow rate of 5-30 g/10 min., at extrusion temperature, under 1.2 kg load according to ASTM D1238. Extrusion temperature depends on the polymer employed and is typically a few degrees high than the melt temperature. The shrinkage of the resin, upon re-solidification, is less than or equal to 0.010 in./in., according to ASTM injection-molding test standards. In addition to ABS, other suitable thermoplastic resins include polycarbonate, polylactic acid, polyphenylsulfone, and mixtures of these. Typical polycarbonate resin is Lexan® HF1110 from G. E. Plastics. A particular polycarbonate/ABS resin is Cycloloy® C1110HF available for G.E. Plastics. A typical polyphenylsulfone resin is Radel® R 5600NT from BP Amoco.

U.S. Pat. No. 6,645,412 to Stratasys, Inc. discloses a process of making a three dimensional object by fuse deposition modeling techniques. The thermoplastic resin modeling material is in the form of a flexible filament and supplied to an extrusion head initially in solid form. The extrusion head melts a bit of the filament and deposits the molten ABS in a specific spot indicated by the CAD system. Very quickly the molten ABS re-solidifies and the extrusion head moves to the next CAD indicated spot and repeats the process.

U.S. Pat. No. 7,314,591 to Stratasys, Inc. discloses a process of making a three dimensional object by fuse deposition modeling techniques, wherein the thermoplastic material contains silicone to aid in the removal of any unwanted portion of the object.

U.S. Pat. No. 7,364,686 to Objet Geometries, Ltd. discloses building material for making a three dimensional object by fuse deposition modeling techniques. It also discloses supporting material used to make features not supported by the floor of the object, which are later removed from the final object. The supporting material has a lesser tensile strength, or different viscosity, and a lower cohesiveness (bond strength to the previous layer). Also disclosed is a printing devise that has multiple printing heads.

WO Pat. App. No. 2012/058278 discloses a fused deposition printing process and article having a first layer of ABS or other similar type polymers and an overcoat layer that can include polyurethane or polyester. In between each polymer layer, an "ink" layer is deposited. The ink layer can have different functions, one of which is to act as a bonding layer to both polymer layers.

What is particularly difficult to produce is an article having a softer (less hard) area/layer and make it bond to the suitable resins—ABS, polycarbonate, polylactic acid, or polyphenylsulfone, for example. Polystyrene, for example will not adequately bond to the suitable thermoplastic resins. In fact polystyrene is a support structure for an article being manufactured by fuse deposition molding techniques. If the article being molded is a 3D model of a cave, for example, the interior of the cave and the cave prototype is constructed from the floor to the ceiling, then stalactites will require a temporary support until the ceiling is completed. Thus the support structure is required to temporarily support the stalactites. Later, when the cave is complete, the stalactites will be secured to the ceiling and the temporary support structure can then be removed. It must be easily removed. Polystyrene is a good support structure for 3D modeling as it can be easily removed. However it is not suitable for a final article because it does not adhere well to ABS, polycarbonate, etc. It cannot be used to create an article having hard areas/layers and soft or less hard areas/layers.

Although these documents relate to fused deposition printing, there is a need for articles that have one or more flexible areas or layers that adheres well to a hard area or layer constructed using ABS, for example. In particular there is a need for an article that has areas or layers of different hardness, such as a hard base layer and a flexible over layer that bonds very well to the hard layer, such that one cannot separate the areas or layers from one another, unless you destroy the article. Thus the flexible material is not a temporary supporting material as disclosed previously. Supporting material is never part of the final article.

SUMMARY OF THE INVENTION

In the broadest sense the present invention is an article produced, at least in part, from a three dimensional fused deposition printing process wherein the article has areas or layers of dissimilar hardness. More specifically, the layer of less hard material is a composition comprising a controlled distribution hydrogenated styrenic block copolymer, a thermoplastic elastomer, and an optional functionalized block copolymer.

In the broadest sense, the present invention is a fuse molded modeling three dimensional article having areas of dissimilar or different hardness, wherein one of said areas is hard and is plastic, metal, glass, wood, concrete, rock, or mixtures thereof, and another of said areas is a less hard area comprising a controlled distribution hydrogenated styrenic block copolymer composition. Although the metal, glass, wood, concrete, and rock are not fuse moldable material, the plastic and the controlled distribution hydrogenated styrenic block copolymer composition are. Thus the scope of the invention is meant to include articles where only one area or layer of the article is fuse molded, or wherein both the hard area/layer and the soft area/layer is formed via a fuse molded technique.

The process of making the fuse moldable article is also patentable. In the broadest sense, a additive-process method for making a three dimensional article, comprises: providing a solid feedstock of a first plastic material to at least one extrusion head, melting said solid feedstock of a first plastic material in said at least one extrusion head, depositing layers of said first plastic material on to a platform to form a portion of a three dimensional article, providing a solid second feedstock of a second plastic material to said at least one extrusion head, wherein said solid second feedstock of a second plastic material has a dissimilar hardness compared to said solid feedstock of a first plastic material, melting said solid feedstock of a second plastic material in said at least one extrusion head, and depositing layers of said second plastic material on to said portion of said three dimensional article, thereby forming a three dimensional article having layers of dissimilar or different hardness, wherein either said first plastic material or said second plastic material comprises a controlled distribution hydrogenated styrenic block copolymer composition.

DESCRIPTION OF THE PREFERRED EMBODIMENTS

The ranges set forth in this specification included not only each end number but also every conceivable number in between the end number, as this is the very definition of a range.

Fused Deposition Modeling (FDM) is a known process for making articles from a suitable thermoplastic resin such as acrylonitrile-butadiene-styrene (ABS). The benefit of the process is that an article can be made straight from CAD systems—eliminating the need for a prototype or mold. The ABS modeling feed material can be in the form of a solid flexible filament, sticks, or pellets and supplied to an extrusion head of a 3-D printer used in FDM. The extrusion head of the printer melts a bit of the filament, stick or pellets and deposits the molten ABS in a specific spot indicated by the CAD system. Very quickly the molten ABS re-solidifies and the extrusion head moves to the next CAD indicated spot and repeats the process, thus forming an article.

Suitable thermoplastic resin has a tensile strength of between 3000 psi and 12,000 psi. Also the resin has a melt flow rate of 5-30 g/10 min., at extrusion temperature, under 1.2 kg load according to ASTM D1238. Also the resin has shrinkage upon re-solidification of less than or equal to 0.010 inch/inch, according to ASTM injection-molding test standards. In addition to ABS, other suitable thermoplastic resins include polycarbonate, polylactic acid, polyphenylsulfone, and mixtures of these, meet the above characteristics. The known polymers used in 3-D fused deposition molding techniques are considered "hard materials". Typical polycarbonate resin is Lexan® HF 1110 from G. E. Plastics. A particular polycarbonate/ABS resin is Cycloloy® C1110HF available for G.E. Plastics. A typical polyphenylsulfone resin is Radel® R 5600NT from BP Amoco. Other hard materials can be metal, wood, concrete, rock, glass and other solid materials that are harder than the softer material disclosed below.

Suitable less hard/soft material is a controlled distribution hydrogenated styrenic block copolymer (cdhSBC) composition. This material is applied by fused deposition modeling techniques to create an article. It can be applied to a material that is harder than itself, or a hard material can be applied to it. Therefore the cdhSBC composition can serve as a base portion of an article, or as an area or layer over a harder base. In the later situation, the base is not required to be a material that is made by fused deposition molding techniques as described above. However the scope of the present invention also includes an article wherein the entire object is made by fuse deposition molding techniques. In such an object, the article is formed from dissimilar hardness plastics.

The flexible material suitable to form the article of the present invention is a controlled distribution hydrogenated styrenic block copolymer composition. A typical controlled distribution hydrogenated styrenic block copolymer is a tri-block copolymer having styrene end blocks and a mid block of hydrogenated butadiene and styrene (typically written S-EB/S-S), wherein the styrene distribution in the hydrogenated butadiene mid block is controlled—it is not a random or a tapered distribution. Hydrogenated controlled distribution styrenic block copolymers are disclosed in U.S. Pat. Nos. 7,067,589 and 7,169,848 assigned to the assignee of this invention.

The cdhSBC composition contains a thermoplastic elastomer of polyester, copolyester, or polyurethane, or a mixture of two or more of these. These components are present in a range of 15 to 60 wt. % based on the weight of the cdhSBC composition. Thus the cdhSBC composition includes cdhSBC and a thermoplastic elastomer, and optionally a functionalized block copolymer. The composition comprises 15 to 60 wt. % thermoplastic elastomer and 20 to 85 wt. % of cdhSBC where in the total weight of the cdhSBC composition is 100 wt. %. Up to 30 wt. % of the cdhSBC in the cdhSBC composition may be functionalized block copolymer.

As stated above an optional component of the cdhSBC composition is a functionalized block copolymer. Known are functionalized hydrogenated styrenic block copolymer (hSBC). These type copolymers are disclosed in U.S. Pat. No. 4,578,429 to Gergen, assigned to the assignee of this invention. The functionalized styrenic block copolymer contains maleic acid or maleic anhydride that is grafted onto the polymer mid block. Other suitable monomer acids or their derivatives, such as anhydride derivatives, include maleic acid, succinic acid, itaconic acid, fumaric acid, or acrylic acid. A preferred functionalized block copolymer is a maleated styrene-ethylene/butadiene-styrene. The maleic anhydride is grafted onto the ethylene/butadiene mid block, thus providing more reaction sites when used in a composition. The functionalized block copolymer accounts for about 0 to about 30 wt. % based on the weight of the cdhSBC composition. Also suitable as both a controlled distribution hydrogenated styrenic block copolymer and a functionalized block copolymer is a controlled distribution block copolymer that is functionalized (see, U.S. Pat. No. 7,067,589. It too is assigned to the assignee of the present invention).

The cdhSBC composition in an article of the present invention also includes functionalized block copolymers that are not styrenic block copolymers. For example, functionalized block copolymers of a polyolefin block or ethylene vinyl acetate are within the scope of the present invention. Typical polyolefin block copolymers are polyethylene or polypropylene or mixtures thereof, that are functionalized with monomer acids or their derivatives including maleic acid, succinic acid, itaconic acid, fumaric acid, or acrylic acid. Of these maleic acid or maleic anhydride is preferred. Of the polyolefin block copolymers, polypropylene block copolymer functionalized with maleic anhydride is most preferred. These are also employed in the range of 0 to 30 wt. % based on the weight of the cdhSBC composition of the present invention.

Anionic, solution copolymerization to form the controlled distribution copolymers of the article of the present invention can be carried out using, to a great extent, by known and previously employed methods and materials. In general, the copolymerization is attained anionically, using known selections of adjunct materials, including polymerization initiators, solvents, promoters, and structure modifiers, but as a key feature of the present invention, in the presence of a certain distribution agent. Such distribution agent is, in preferred embodiments, a non-chelating ether. Examples of such ether compounds are cyclic ethers such as tetrahydrofuran and tetrahydropyrane and aliphatic monoethers such as diethyl ether and dibutyl ether. In some cases, particularly where the vinyl content of the conjugated diene is to be over 50%, it may be necessary to use a chelating agent, including dialkyl ethers of ethylene glycol and aliphatic polyethers such as diethylene glycol dimethyl ether and diethylene glycol diethyl ether. Other distribution agents include, for example, ortho-dimethoxybenzene or "ODMB", which is sometimes referred to as a chelating agent. Preferably the ether is an aliphatic monoether, and more preferably diethyl ether. Such copolymerization can be conducted as a batch, semi-batch, or continuous preparation, with batch being most preferred, but regardless, it is important that the randomization agent be present in the selected solvent prior to or concurrent with the beginning of the copolymerization process.

The introduction of the distribution agent counteracts the preference of the growing chain end to attach to one monomer over another. For example, in the case of styrene and a diene, the preference would be toward the diene. This distribution agent operates to promote more efficient "controlled distribution" copolymerization of the two monomers because the living chain end "sees" one monomer approximately as easily as it "sees" the other. The polymerization process is thereby "tuned" to allow incorporation of each of the monomers into the polymer at nearly the same rate. Such a process results in a copolymer having no "long runs" of either of the monomer components—in other words, a controlled distribution copolymer as defined hereinabove. In the preferred process, the mono alkenyl arene monomer will be nearly consumed by the time that the slow addition of the second aliquot of diene is complete, so that the polymerization ends rich in the conjugated diene. Short blocks of the conjugated diene monomer may be formed throughout the polymerization, but blocks of the mono alkenyl arene monomer are only formed when the concentration of the conjugated diene monomer becomes quite low. Under the preferred conditions, the cumulative percentage of the mono alkenyl arene monomer in the B block peaks at about 40-60% overall conversion, but only exceeds the final value by about 25-30%. The result of this relatively uniform distribution of monomers is a product having a single Tg, which is a weighted average of the Tg values of the two corresponding homopolymers.

As noted above, the distribution agent is preferably a non-chelating ether. By "non-chelating" is meant that such ethers will not chelate with the growing polymer, that is to say, they will not form a specific interaction with the chain end, which is derived from the initiator compound (e.g., lithium ion). Because the non-chelating ethers used in the present invention operate by modifying the polarity of the entire polymerization charge, they are preferably used in relatively large concentrations. Where diethyl ether, which is preferred, is selected, it is preferably at a concentration from about 0.5 to about 10%, preferably about 1 to about 10% by weight of the polymerization charge (solvent and monomers), and more preferably from about 3 to about 6% by weight. Higher concentrations of this monoether can alternatively be used, but appear to increase cost without added efficacy. When the distribution agent is ODMB, the amount used is typically about 20 to about 400 parts by million weight ("PPMW"), based on the total reactor contents, preferably about 20 to about 40 PPMW for low vinyl products and about 100 to 200 PPMW for higher vinyl products.

An important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol % of the condensed butadiene units in the copolymer block have 1,2 vinyl configuration as determined by proton NMR analysis. For selectively hydrogenated block copolymers, preferably about 30 to about 70 mol % of the condensed butadiene units should have 1,2 configuration. For unsaturated block copolymers, preferably about 20 to about 40 mol % of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. Re. 27,145, which disclosure is incorporated by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Other important starting materials for anionic copolymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example. U.S. Pat. Nos. 4,039,593 and Re. 27,145, which descriptions are incorporated herein by reference.

Polymerization conditions to prepare the novel copolymers of the present invention are typically similar to those used for anionic polymerizations in general. In the present invention polymerization is preferably carried out at a temperature of from about −30° to about 150° C., more preferably about 10° to about 100° C., and most preferably, in view of industrial limitations, about 300 to about 90° C. It is carried out in an inert atmosphere preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

As discussed above, an important discovery of the present invention is the control of the monomer feed during the polymerization of the controlled distribution block. To minimize blockiness, it is desirable to polymerize as much of the styrene as possible in the presence of butadiene. Towards that end, a preferred process adds the styrene charge as quickly as possible, while adding the butadiene slowly, so as to maintain a concentration of no less than about 0.1% wt. of butadiene for as long as possible, preferably until the styrene is nearly exhausted. If the butadiene falls below this level, there is a risk that a styrene block will form at this point. It is generally undesirable to form a styrene block during the butadiene charge portion of the reaction.

In a two-reactor polymerization scheme, this is most readily accomplished by adding about 80 to 100% of the mono alkenyl arene to the second reactor, along with about 10 to about 60% of the conjugated diene. The monomers are then caused to start polymerization via transfer of the living polymer from the first reactor. After about 5 to 60 mol % of the monomers have polymerized, the remaining portion of the mono alkenyl arene (if any) is added and the remaining conjugated diene monomer is added at a rate that maintains the concentration of the conjugated diene monomer at no less than about 0.1% wt. The rate of diene monomer addition will be determined by the styrene content of the midblock, the reaction temperature and the type and concentration of the distribution control agent used. Reaction rates are relatively fast in the presence of 6-10% diethyl ether. In this system, the diene is typically charged over 15 to 60 minutes. Rates for both monomers are slower in the presence of 0.5-1% diethyl ether or 35-40 PPM o-dimethoxybenzene. In this solvent system, it is more typical to add the diene over 60 to 90 minutes. The higher the midblock styrene, the more advantageous it is to add the diene slowly. If the polymer is to be prepared in a fully sequential process, it is preferable to ensure that the butadiene addition continues until about 90% of the monomers in block B1 have been polymerized, and the percentage of the mono alkenyl arene monomer in the non-reacted monomer pool has been reduced to less than 20% wt., preferably less than 15% wt. In this way the formation of styrene blocks is prevented throughout the majority of the polymerization and there is sufficient conjugated diene left at the end of the polymerization to ensure that the terminal region of the B1 block is richer in the diene monomer. The resulting polymer block has diene rich regions near the beginning and the end of the block and an arene rich region near the center of the block. In products of the preferred process, typically the first 15 to 25% and the last 75 to 85% of the block are diene rich, with the remainder considered to be arene rich. The term "diene rich" means that the region has a measurably higher ratio of diene to arene than the center region. Another way to express this is the proportion of mono alkenyl arene units increases gradually along the polymer chain to a maximum near the middle or center of the block and then decreases gradually until the polymer block is fully polymerized. In a preferred embodiment, all of the mono alkenyl arene and about 10 to 20% of the conjugated diene are charged to the reactor, and the remainder of the conjugated diene is added after about 5 to about 10% of the original monomers have polymerized.

It is typically possible to achieve the desired distribution of the arene monomer in the final product using the process described above if fairly high levels of the distribution control agent are used. At higher midblock styrene levels and low levels of the distribution control agent, some blockiness is unavoidable. It is preferable to prepare these products by coupling. This insures that any blocky styrene that is formed is located at some distance from the endblocks. When polymers of the present invention are prepared by coupling, it is preferable to reserve 5 to 10% of the diene monomer, and add this charge once the polymerization of the arene monomer is complete. This ensures that all of the chains end in a diene unit. The living diene chain ends generally react more efficiently with coupling agents.

If the products of the present invention are being prepared in a single reactor process in which all of the B1 monomer is charged to a reactor containing the living A block, it is preferable to start the diene monomer addition about 1 minute before starting the arene monomer addition. It is also preferable to charge both monomers rapidly at first and then decrease the diene addition rate once the majority of the arene monomer has been added. This process ensures that the initial region of the B1 block will be rich in the diene monomer, and builds a large enough pool to avoid becoming starved in the diene monomer early in process step. As discussed above, the optimal rates will depend on the styrene content of the midblock, the reaction temperature and the type and concentration of the distribution control agent used.

For the controlled distribution or B block the weight percent of mono alkenyl arene in each B block is between about 10 wt. % and about 75 wt. %, preferably between about 25 wt. % and about 50 wt. % for selectively hydrogenated polymers.

As used herein, "thermoplastic block copolymer" is defined as a block copolymer having at least a first block of one or more mono alkenyl arenes, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer, tetra-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_n X$, or both types of structures can be combined in a mixture. In addition it is contemplated that asymmetrical, polymodal block copolymers are included, where some of the A blocks have higher molecular weights than some of the other A blocks—e.g., such a polymer could have the structure $(A_1-B)_d$—X—$_e(B-A_2)$ where d is 1 to 30 and e is 1 to 30, and the molecular weight of $A_1$ and $A_2$ blocks differ by at least 20 percent. Some A-B diblock polymer can be present but preferably at least about 70 wt. % of the block copolymer is A-B-A or radial (or otherwise branched so as to have 2 or more terminal resinous blocks per molecule) so as to impart strength.

Preparation of radial (branched) polymers requires a post-polymerization step called "coupling". In the above radial formula n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; 4,444,953 and Canadian Pat. No. 716,645. Suitable polyalkenyl coupling agents include divinylbenzene, and preferably m-divinylbenzene. Preferred are tetra-alkoxysilanes such as tetra-ethoxysilane (TEOS), aliphatic diesters such as dimethyl adipate and diethyl adipate, and diglycidyl aromatic epoxy compounds such as diglycidyl ethers deriving from the reaction of bis-phenol A and epichlrohydrin.

Additional possible post-polymerization treatments that can be used to further modify the configuration of the polymers and therefore their properties include capping and chain-termination. Capping agents, such as ethylene oxide, carbon dioxide, or mixtures thereof serve to add functional groups to the chain ends, where they can then serve as reaction sites for further property-modifying reactions. In contrast, chain termination simply prevents further polymerization and thus prevents molecular weight growth beyond a desired point. This is accomplished via the deactivation of active metal atoms, particularly active alkali metal atoms, and more preferably the active lithium atoms remaining when all of the monomer has been polymerized. Effective chain termination agents include water; alcohols such as methanol, ethanol, isopropanol, 2-ethylhexanol, mixtures thereof and the like; and carboxylic acids such as formic acid, acetic acid, maleic acid, mixtures thereof and the like. See, for example, U.S. Pat. No. 4,788,361, the disclosure of which is incorporated herein by reference. Other compounds are known in the prior art to deactivate the active or living metal atom sites, and any of these known compounds may also be used. Alternatively, the living copolymer may simply be hydrogenated to deactivate the metal sites.

The polymerization procedures described hereinabove, including preparation of the diene/alkenyl arene copolymer and of di-block and multi-block copolymers prepared therewith, can be carried out over a range of solids content, preferably from about 5 to about 80% by weight of the solvent and monomers, most preferably from about 10 to about 40 wt. %. For high solids polymerizations, it is preferable to add any given monomer, which may include, as previously noted, a previously prepared homopolymer or copolymer, in increments to avoid exceeding the desired polymerization temperature. Properties of a final tri-block polymer are dependent to a significant extent upon the resulting alkenyl content and diene content. It is preferred that, to ensure significantly elastomeric performance while maintaining desirably high Tg and strength properties, as well as desirable transparency, the tri-block and multi-block polymer's alkenyl arene content is greater than about 20% wt., preferably from about 20 to about 80% wt. This means that essentially all of the remaining content, which is part of the diene/alkenyl arene block, is diene.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled $(AB)_2$ X block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. For the tetrablock copolymer ABAB the block size for the terminal B block should be about 2,000 to about 40,000, and the other blocks may be similar to that of the sequential triblock copolymer. These molecular weights are most accurately determined by light scattering measurements, and are expressed as number average molecular weight.

An important feature of the thermoplastic elastomeric di-block, tri-block and tetra-block polymers of the present invention, including one or more controlled distribution diene/alkenyl arene copolymer blocks and one or more mono alkenyl arene blocks, is that they have at least two Tg's, the lower being the single Tg of the controlled distribution copolymer block which is an intermediate of its constituent monomers' Tg's. Such Tg is preferably at least about −60° C., more preferably from about −40° C. to about +30° C., and most preferably from about −40° C. to about +10° C. The second Tg, that of the mono alkenyl arene "glassy" block, is preferably from about +80° C. to about +110° C., more preferably from about +80° C. to about +105° C. The presence of the two Tg's, illustrative of the microphase separation of the blocks, contributes to the notable elasticity and strength of the material in a wide variety of applications, and its ease of processing and desirable melt-flow characteristics.

It should be noted that, in yet another embodiment of the present invention, additional property improvements of the compositions hereof can be achieved by means of yet another post-polymerization treatment, that of hydrogenation of the block copolymer. The preferred hydrogenation is selective hydrogenation of the diene portions of the final block copolymer. Alternatively both the B blocks and the A blocks may be hydrogenated, or merely a portion of the B blocks may be hydrogenated. Hydrogenation generally improves thermal stability, ultraviolet light stability, oxidative stability, and, therefore, weatherability of the final polymer. A major advantage of the present invention is that the distribution agent, such as the non-chelating monoether, which is present during the initial polymerization process, does not interfere with or otherwise "poison" the hydrogenation catalyst, and thus the need for any additional removal steps is obviated.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90% of the conjugated diene double bonds have been reduced, and between zero and 10% of the arene double bonds have been reduced. Preferred ranges are at least about 95% of the conjugated diene double bonds reduced, and more preferably about 98% of the conjugated diene double bonds are reduced. Alternatively, it is possible to hydrogenate the polymer such that aromatic unsaturation is also reduced beyond the 10% level mentioned above. Such exhaustive hydrogenation is usually achieved at higher temperatures. In that case, the double bonds of both the conjugated diene and arene may be reduced by 90% or more.

Once the hydrogenation is complete, it is preferable to extract the catalyst by stirring with the polymer solution a relatively large amount of aqueous acid (preferably 20-30% by weight), at a volume ratio of about 0.5 parts aqueous acid to 1 part polymer solution. Suitable acids include phosphoric acid, sulfuric acid and organic acids. This stirring is continued at about 50° C. for about 30 to about 60 mins. while sparging with a mixture of oxygen in nitrogen. Care must be exercised in this step to avoid forming an explosive mixture of oxygen and hydrocarbons.

It is also important to control the molecular weight of the various blocks. Desired number average block weights are from about 5.0 to about 7.5 kg/mol for the mono alkenyl arene A block. For the triblock, which may be a sequential ABA or coupled (AB)$_2$ X block copolymer, the total apparent number average molecular weight should be from about 70 to about 150 kg/mol, preferably from about 125 to about 150 kg/mol, and for the coupled copolymer from about 35 to about 75 kg/mol per arm, preferably from about 62.5 to about 75 kg/mol per arm. With the expression "apparent", as used throughout the specification, is meant the molecular weight of a polymer as measured with gel permeation chromatography (GPC) also referred to as Size Exclusion Chromatography (SEC) using polystyrene calibration standards (using a method analogue to the method described in ASTM D5296-05). Reference is made herein to number average molecular weight. The molecular weight distribution ($M_w/M_n$) for anionically polymerized polymers is small. Therefore, as is common in the art, as number average molecular weight the peak position is used, since the differences between the peak molecular weight ($M_p$) and the number average molecular weight ($M_n$) are very small. Another important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Thus, "vinyl" in no way refers to PVC. When referring to the use of butadiene as the conjugated diene, it is preferred that at least about 40 wt. %, preferably at least 60 wt. %, more preferably from about 60 to about 80 wt. % and most preferably from about 65 to about 75 wt. % of the condensed butadiene units in the copolymer block have 1,2 vinyl configuration as determined by proton NMR analysis.

A controlled distribution hydrogenated styrenic block copolymer has the following characteristics: A general configuration A-B, A-B-A, (A-B)$_n$, (A-B-A)$_n$, (A-B-A)$_n$X, (A-B)$_n$X or mixtures thereof, where n is an integer from 2 to about 30, and X is a coupling agent residue and wherein:

a. prior to hydrogenation each A block is a mono alkenyl arene polymer block and each B block is a controlled distribution copolymer block of at least one conjugated diene and at least one mono alkenyl arene;
b. subsequent to hydrogenation about 0-10% of the arene double bonds have been reduced, and at least about 90% of the conjugated diene double bonds have been reduced;
c. each A block having a number average molecular weight between about 3,000 and about 60,000 and each B block having a number average molecular weight between about 30,000 and 300,000;
d. each B block comprises terminal regions adjacent to the A blocks that are rich in conjugated diene units and one or more regions not adjacent to the A blocks that are rich in mono alkenyl arene units;
e. the total amount of mono alkenyl arene in the hydrogenated block copolymer is about 20% wt. to about 80% wt.;
f. the weight percent of mono alkenyl arene in each B block is between about 10% and about 75%; and
g. the styrene blockiness index of the B block is less than about 40%.

EXAMPLES

The following examples are intended to be illustrative only, of the material useful in making the article of the present invention. Formulations 1-6 are present in Table 1, in parts by weight and in wt. %. Various properties of each formulation was also tested and recorded in Table 1.

mm/min. In this type adhesion test an averaged peel strength ≥75 N/25 mm is considered very good adhesion, while ≥100

TABLE 1

| Formulation | 1 parts | Wt. % | 2 parts | Wt. % | 3 parts | Wt. % | 4 parts | Wt. % | 5 parts | Wt. % | 6 parts | Wt. % |
|---|---|---|---|---|---|---|---|---|---|---|---|---|
| S-EB/S-S A | 100 | 64 | 100 | 60 | 100 | 60 | | | 100 | 45 | 100 | 45 |
| S-EB/S-S B | | | | | | | 100 | 40 | | | | |
| Oil | 33 | 21 | 33 | 20 | 33 | 20 | 100 | 40 | 70 | 32 | 70 | 32 |
| High Impact polystyrene | 23 | 15 | | | | | | | | | | |
| copolyester | | | 33 | 20 | | | 50 | 20 | 50 | 23 | | |
| Thermoplastic polyurethane | | | | | 33 | 20 | | | | | 50 | 23 |
| Shore A Hardness, | 42 | | 39 | | 38 | | 32 | | 54 | | 53 | |
| MFR, 230° C./2.16 kg (dg/min) | <1 | | <1 | | 1 | | 3.4 | | 6 | | 17 | |
| Initial Adhesion | | | | | | | | | | | | |
| 180° peel on ABS | 70 | | 104 | | 78 | | 62 | | 128 | | 104 | |
| 180° peel on PC | 60 | | 99 | | 70 | | 38 | | 130 | | 110 | |
| 180° peel on MMA-ABS | 117 | | 108 | | 83 | | 62 | | | | | |
| 180° peel on PC/ABS | | | | | | | | | 127 | | 99 | |
| 90° peel on ABS | 8 | | 18 | | | | | | | | | |
| 90° peel on PC | 10 | | 17 | | | | | | | | | |
| 90° peel on MMA-ABS | 13 | | 19 | | | | | | | | | |
| Adhesion after 60° C./ 7 days heat aging | | | | | | | | | | | | |
| 180° peel on ABS | | | | | | | | | 127 | | 93 | |
| 180° peel on PC | | | | | | | | | 123 | | 101 | |
| 180° peel on PC/ABS | | | | | | | | | 119 | | 89 | |
| Physical Properties, MD | | | | | | | | | | | | |
| Tensile Strength, MPa | 4.8 | | 4 | | | | | | | | | |
| Elongation, % | 350 | | 590 | | | | | | | | | |
| 100% Modulus MPa | 1.6 | | 1.0 | | | | | | | | | |

Controlled distribution block copolymer A contains 51% polystyrene, has a Shore A hardness of 55, a tensile strength of 20 MPa, an elongation of 1080%, and a 300% modulus of 1.4 MPa.

Controlled distribution block copolymer B contains 58% polystyrene, has a Shore A hardness of 83, a tensile strength of 30 MPa, an elongation of 665%, and a 300% modulus of 7.9 MPa.

It is difficult to obtain good peel adhesion to ABS, polycarbonate and others with a Shore Hardness of less than 70. The Shore A hardness for formulations 1-6 ranged from 32 to 54 in Table 1. However the Shore A hardness for the compositions of the present invention range from about 40 to about 95, and preferably from about 60 to about 95.

All formulations were prepared by twin screw extrusion. All formulations contain similar antioxidants, and all ingredients were dry blended prior to extrusion. The MFR of the high impact polystyrene was 11 dg/min, for copolyester it was 13 dg/min. Thermoplastic polyurethane had a Shore A hardness of 80. Melt flow rates were tested according to ASTM D1238 at 230° C. and 2.16 kg. The MFR for the formulations set forth in Table 1 range from less than 1 to 17. However, for the present invention the MFR can be as high as about 28 at 230° C. and 2.16 kg. The 180° adhesion was tested according to JIS K6854 with a crosshead speed of 200 mm/min. In this type adhesion test an averaged peel strength ≥75 N/25 mm is considered very good adhesion, while ≥100 N/25 mm is considered excellent adhesion. The 180° adhesion test has a peel strength of at least about 60N/25 mm. The 90° adhesion was tested according to Renault D41 1016 method, with a 2 mm wide contact surface. The clamps are movable such that the load is always perpendicular to the propagating point of failure. Average peel forces of about 10 N are considered very good adhesion (90° peel).

Example 2

In this example the following formulations were fuse deposition molded into flexible filament and used to make a colored article of the present invention. White and pink color masterbatches where employed to illustrate that articles can be multicolored to high light certain areas of the article if desired. The ingredients are in terms of either parts per hundred rubber or the equivalent weight percent. Both formulations used a controlled distribution hydrogenated styrenic block copolymer, a functionalized hydrogenated styrenic block copolymer of maleic anhydride grafted onto the mid block of styrene-ethylene butadiene-styrene (SEBS). Irganox 101 and Irgafos 168 are primary and secondary stabilizers well known in the industry. Each of these formulations had a Shore A hardness of 80.

|  | Phr | % |
| --- | --- | --- |
| S-EB/S-S | 25.00 | 24.6 |
| MAH-SEBS | 25.00 | 24.6 |
| PET | 25.00 | 24.6 |
| PBT | 25.00 | 24.6 |
| Irganox 1010 | 0.20 | 0.2 |
| Irgafos 168 | 0.40 | 0.4 |
| Color Masterbatch | 1.00 | 1.0 |
| Sum gr |  | 100 |
| S-EB/S-S | 25.00 | 24.5 |
| MAH-SEBS | 25.00 | 24.5 |
| Copolyester | 50.00 | 49.0 |
| Irganox 1010 | 0.20 | 0.2 |
| Irgafos 168 | 0.40 | 0.4 |
| Color Masterbatch | 1.50 | 1.5 |
| Sum gr |  | 100 |

An article of the present invention was produced on a Stratasys 3D printer for Fuse Deposition Molding technique. The last two compositions were dry mixed, introduced into an extruder, heated to melt the composition, and extruded into monofilament of about 1.75 mm. Once cooled, this solid monofilament was introduced into a Stratasys 3D printer and various articles were made. In the printer a small amount of the monofilament was heated by an extrusion head until it melted, then it was deposited on a platform or on a previous layer of deposited material thereby forming an article that has at least one area or layer of dissimilar hardness. For purposes of this invention an extrusion head includes melting apparatus and a die through which the molten composition is extruded. Thus even if the melting apparatus is separate from the die head, the claims of the present invention are meant to cover this to. Of course one skilled in the art would recognize that the printer may contain just one extrusion head, but preferably it has at least 2 heads—one for each polymer. Of course the more extrusion heads the printer has, the faster it can produce an article. Also one skilled in the art would recognize that each extrusion head would work more efficiently if each head had its own solid feedstock. Although this description is described in terms of each portion of the article being produced by fused deposition molding, one skilled in the art also recognizes that one portion of the article may be preshaped or premade from a material (not fuse moldable) such as glass, metal, wood etc as described above, and to produce the final article only the controlled distribution hydrogenated styrenic block copolymer need to be fuse molded onto the premade material.

Thus it is apparent that there has been provided, in accordance with the invention, both an fused deposition molded article and a process for making the article, both of which incorporate a controlled distribution hydrogenated styrenic block copolymer that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

The invention claimed is:

1. A fuse molded modeling three dimensional article having areas of dissimilar or different hardness,
wherein the areas of dissimilar or different hardness are fuse deposition molded;
wherein one of said fuse deposition molded area is hard, and another of said fuse deposition molded areas is a flexible material that is less hard;
wherein the hard area comprises a thermoplastic selected from acrylonitrile-butadiene-styrene, polylactic acid, polyamide, polyphenylsulfone, polycarbonate, polyethylene, polypropylene, polyethylene/acrylonitrile-butadiene-styrene, polycarbonate/acrylonitrile-butadiene-styrene, methylmethacrylate/acrylonitrile-butadiene-styrene, polyetherimide, and mixtures thereof;
wherein the flexible material consists essentially of a block copolymer composition, and 15 to 60 wt. % of a polyester, copolyester, polyurethane, or a mixture of two or more of these, or 15 wt. % of high impact polystyrene;
wherein said block copolymer composition comprises:
20 to 85 wt % of a controlled distribution hydrogenated styrene-ethylene butadiene-styrene block copolymer based on the total weight of the composition;
up to 30 wt % of a functionalized controlled distribution hydrogenated styrene-ethylene butadiene-styrene block copolymer having maleic anhydride grafted onto a mid block of the styrene-ethylene butadiene-styrene block copolymer; and
wherein the flexible material has
a melt flow rate of less than 28 dg/min according to ASTM D1238 at 230° C. and 2.16 kg, and
a peel strength of at least about 60N/25 mm in 180° initial adhesion test on the thermoplastic, according to JIS K6854;
wherein said thermoplastic is supplied as flexible filaments, sticks, or pellets initially in solid form to an extrusion head of a 3-D printer, where the thermoplastic is melted and deposited, forming the hard area;
wherein the flexible material has a Shore A hardness of from greater than 80 to about 95;
wherein said flexible material is not a temporary supporting material, wherein said flexible material is fuse molded on the hard area comprising the thermoplastic by deposition using the 3-D printer, and said flexible material is supplied as a flexible filament, sticks, or pellets initially in solid form to an extrusion head of the 3-D printer, and
wherein the three dimensional article is made without a mold using the 3-D printer.

2. The fuse molded modeling three dimensional article of claim 1, wherein said controlled distribution hydrogenated styrene-ethylene butadiene-styrene block copolymer is in a range of 40 to 85 wt. %.

3. The fuse molded modeling three dimensional article of claim 1, wherein the flexible material consist essentially of the block copolymer composition, and thermoplastic elastomer ii a copolyester.

4. The fuse molded modeling three dimensional article of claim 1,
wherein the flexible material consist essentially of the block copolymer composition, and a copolyester; and
wherein said thermoplastic forming said hard area is acrylonitrile-butadiene-styrene, polylactic acid, polyamide, polyphenylsulfone, polycarbonate, polyethylene, polypropylene, polyethylene/acrylonitrile-butadiene-styrene, polycarbonate/acrylonitrile-butadiene-styrene, methylmethacrylate/acrylonitrile-butadiene-styrene, or polyetherimide.

5. An additive-process method for making a three dimensional article, comprising:
providing a solid feedstock of a first plastic material to at least one extrusion head of a 3-D printer,
melting said solid feedstock of the first plastic material in said at least one extrusion head,
depositing layers of said first plastic material on to a platform to form a portion of a three dimensional article,
providing a solid second feedstock of a second plastic material to said at least one extrusion head, wherein said solid second feedstock of the second plastic material is less hard has a dissimilar hardness compared to said solid feedstock of the first plastic material,
melting said solid feedstock of the second plastic material in said at least one extrusion head, and
depositing layers of said second plastic material on to said portion of said three dimensional article comprising the first plastic material, thereby forming the three dimensional article having layers or areas of dissimilar or different hardness, wherein the first plastic material consists essentially of a thermoplastic selected from acrylonitrile-butadiene-styrene, polylactic acid, polyamide, polyphenylsulfone, polycarbonate, polyethylene, polyethylene/acrylonitrile-butadiene-styrene, polycarbonate/acrylonitrile-butadiene-styrene, methylmethacrylate/acrylonitrile-butadiene-styrene, polyetherimide, and mixtures thereof;
wherein the second plastic material consists essentially of:
  a) a controlled distribution hydrogenated styrenic block copolymer composition comprising:
    20 to 85 wt % of a controlled distribution hydrogenated styrene-ethylene butadiene-styrene block copolymer based on the total weight of the composition, and
    up to 30 wt % of a functionalized controlled distribution hydrogenated styrene-ethylene butadiene-styrene block copolymer of maleic anhydride grafted onto a mid block of the styrene-ethylene butadiene-styrene, and
  b) 15 to 60 wt % of a polyester, copolyester, or polyurethane, or a mixture of two or more of these, or high impact polystyrene; and wherein,
  the second plastic material has a melt flow rate of less than 28 dg/min according to ASTM D1238 at 230° C. and 2.16 kg, and a peel strength of at least about 60N/25 mm in 1800 initial adhesion test on the first plastic material according to JIS K6854;
wherein the first plastic material is supplied as a-flexible filaments, sticks, or pellets initially in solid form to the at least one extrusion head of the 3-D printer;
wherein the second plastic material has a Shore A hardness of from greater than 80 to about 95;
and wherein the three dimensional article is made without a mold using the 3-D printer.

6. The additive-process method according to claim 5, wherein said solid feedstock of the first plastic material consists essentially of methylmethacrylate/acrylonitrile-butadiene-styrene.

7. The additive-process method according to claim 5, wherein said solid feedstock of the first plastic material consists essentially of acrylonitrile-butadiene-styrene.

8. The additive-process method according to claim 5, wherein said solid feedstock of the first plastic material consists essentially of polycarbonate.

9. The additive-process method according to claim 5, wherein said solid feedstock of the first plastic material consists essentially of polycarbonate/acrylonitrile-butadiene-styrene.

10. An additive-process method for making a three dimensional article, comprising
providing a portion of a three dimensional solid article comprising a thermoplastic selected from acrylonitrile-butadiene-styrene, polylactic acid, polyamide, polyphenylsulfone, polycarbonate, polyethylene, polypropylene, polyethylene/acrylonitrile-butadiene-styrene, polycarbonate/acrylonitrile-butadiene-styrene, methylmethacrylate/acrylonitrile-butadiene-styrene, polyetherimide, and mixtures thereof,
providing a solid feedstock consisting essentially of 15 to 60 wt. % of a polyester, copolyester, or polyurethane, or a mixture of two or more of these, or 15 wt. % of high impact polystyrene; and a controlled distribution hydrogenated styrenic block copolymer composition as a flexible filament, sticks, or pellets initially in solid form to at least one extrusion head of a 3-D printer, wherein the controlled distribution hydrogenated styrenic block copolymer composition comprises:
  20 to 85 wt % of a controlled distribution hydrogenated styrene-ethylene butadiene-styrene block copolymer based on the total weight of the composition, and
  up to 30 wt % of a functionalized controlled distribution hydrogenated styrene-ethylene butadiene-styrene block copolymer of maleic anhydride grafted onto a mid block of the styrene-ethylene butadiene-styrene;
melting said solid feedstock in said at least one extrusion head, and
depositing layers of said molten feedstock on to said portion of a three dimensional solid article,
thereby forming a three dimensional article having areas of dissimilar hardness;
wherein the solid feedstock has a lesser hardness than the thermoplastic
wherein the flexible material has
  a peel strength of at least about 60N/25 mm in 180° initial adhesion test on the thermoplastic according to JIS K6854,
  a melt flow rate of less than 28 dg/min according to ASTM D1238 at 230° C. and 2.16 kg, and
  a Shore A hardness of from greater than 80 to about 95; and
wherein the three dimensional article is made using the 3-D printer in a 3-D fused deposition printing process without a mold.

11. An additive-process method for making a three dimensional article, comprising
providing a portion of a three dimensional solid article of a flexible material consisting essentially of 15 to 60 wt. % of a polyester, copolyester, or polyurethane, or a mixture of two or more of these, or 15 wt. % of high impact polystyrene and a controlled distribution hydrogenated styrenic block copolymer composition comprising:
  20 to 85 wt % of a controlled distribution hydrogenated styrene-ethylene butadiene-styrene block copolymer based on the total weight of the composition,
  up to 30 wt % of a functionalized controlled distribution hydrogenated styrene-ethylene butadiene-styrene block copolymer of maleic anhydride grafted onto a mid block of the styrene-ethylene butadiene-styrene;

providing a solid plastic feedstock as a flexible filament, sticks, or pellets initially in solid form to at least one extrusion head of a 3-D printer, said solid plastic feedstock comprising a thermoplastic selected from acrylonitrile-butadiene-styrene, polylactic acid, polyamide, polyphenylsulfone, polycarbonate, polyethylene, polypropylene, polyethylene/acrylonitrile-butadiene-styrene, polycarbonate/acrylonitrile-butadiene-styrene, methylmethacrylate/acrylonitrile-butadiene-styrene, polyetherimide, and mixtures thereof;

wherein the flexible material has a lesser hardness than the solid plastic feedstock;

melting said solid plastic feedstock in said at least one extrusion head, and depositing layers of said molten plastic feedstock onto said portion of a three dimensional solid article, thereby forming a three dimensional article having areas of dissimilar hardness; and wherein the dimensional article is made without a mold using the 3-D printer in a 3-D fused deposition printing process, wherein the flexible material has a melt flow rate of less than 28 dg/min according to ASTM D1238 at 230° C. and 2.16 kg, a peel strength of at least about 60N/25 mm in 180° initial adhesion test on the thermoplastic according to JIS K6854; and a Shore A hardness of from greater than 80 to about 95.

12. The additive-process method of claim 11, wherein said solid plastic feedstock is acrylonitrile-butadiene-styrene.

* * * * *